United States Patent [19]
Yetter

[11] Patent Number: 5,486,650
[45] Date of Patent: Jan. 23, 1996

[54] PARTITION FOR DIVIDING A DEVICE BOX

[75] Inventor: Karl Yetter, Gales Ferry, Conn.

[73] Assignee: Hubbell Incorporated, Orange, Conn.

[21] Appl. No.: 151,916

[22] Filed: Nov. 15, 1993

[51] Int. Cl.$^6$ ...................................................... H02G 3/08
[52] U.S. Cl. ................................ 174/53; 220/3.2; 220/529
[58] Field of Search .......................... 174/48, 53; 220/3.2, 220/529

[56] References Cited

U.S. PATENT DOCUMENTS

| | | | |
|---|---|---|---|
| 1,296,811 | 3/1919 | Keller | 220/3.92 |
| 1,929,844 | 10/1933 | Haas | 220/529 |
| 2,887,525 | 5/1959 | Lewus | 220/3.94 |
| 3,472,945 | 10/1969 | Trachtenberg | 174/53 |
| 3,587,906 | 6/1971 | Pepe | 220/3.2 |
| 5,013,870 | 5/1991 | Navazo | 174/50 |

Primary Examiner—Kristine L. Kincaid
Assistant Examiner—David A. Tone
Attorney, Agent, or Firm—Jerry M. Presson; David L. Tarnoff

[57] ABSTRACT

A partition for dividing an electrical or telecommunications device box having a substantially planar dividing member with at least one retaining member extending therefrom for cooperating with a mounting post on the base member of the box to support the dividing member substantially perpendicularly to the base member. The partition is removably retained in the box by the retaining member frictionally engaging the post. The retaining member has a specific amount of interference to cause the spring action in the material and to create gripping forces around the mounting post.

25 Claims, 6 Drawing Sheets

PARTITION FOR DIVIDING A DEVICE BOX

FIELD OF THE INVENTION

This invention relates to a partition for dividing a device box into two sections to accommodate separate devices, one on either side of the partition. More specifically, the device box includes a base member having at least one mounting post, and the partition includes a substantially planar divider member with at least one retaining member extending outwardly therefrom for removably engaging the post to support the partition substantially perpendicular to the base member of the device box. The retaining member is preferably designed with a specific amount of interference fit with the mounting post to cause a spring action in its material and to create gripping forces around the mounting post. The partition is therefore easily removed, as well as rigidly held in place when installed in the box.

BACKGROUND OF THE INVENTION

Improvements in the design and manufacture of various kinds of electrical/telecom devices, such as appliances, telephones, computers and lighting systems, have resulted in widespread availability of these devices, as well as their increased use by consumers. Accordingly, consumer demand for increased availability of electrical/telecom outlets, switches, and other wiring devices has also resulted. A demand therefore exists for reducing the cost of electrical/telecom wiring systems, and for reducing the size of these systems for easier installation and improved aesthetics.

To satisfy these needs, conduits have been developed to carry power and communication lines to device boxes, in addition to conventional wiring configurations used behind the walls of residential and commercial buildings. Further, device boxes have been designed to be partitioned to accommodate more than one wiring system and various devices.

Various partitions for device boxes are known in the prior art. These partitions are characterized by a number of limitations and disadvantages. For example, a removable partition for an electrical outlet box is disclosed in U.S. Pat. No. 3,472,945 to Trachtenberg, which has conical insertion members on its bottom edge for coupling the partition to the electrical box. Specifically, the conical insertion members are snap-fitted into existing holes in the base of the outlet box. Since the partition is secured to the base of the outlet box along its bottom edge only, the partition is more likely to be inadvertently disengaged from the base of the outlet box, particularly when extraneous forces are applied to the middle or top sections of the partition.

Another example of a partition for an electrical box is disclosed in U.S. Pat. No. 2,887,525 to Lewus. This patent discloses a partition that is slidably received in slots formed on opposite sides of an electrical wiring box to divide the electrical box in half. The slots provide support for the partition along two of its four sides when it is inserted into the box.

Other examples of partitions for electrical boxes are disclosed in U.S. Pat. No. 1,296,811 to Keller and U.S. Pat. No. 1,929,844 to Haas. Each of these patents disclose a partition which is secured within an electrical outlet box by screws. While these partitions may be more rigidly secured within an electrical box than other partitions of the prior art, these partitions are not readily removable from the box when such removal is desired.

In view of the above, it is apparent that there exists a need for a partition for a device box which will overcome the above problems in the prior art, and which is relatively easy and inexpensive to manufacture. This invention addresses this need in the art along with other needs which will become apparent to those skilled in the art once given this disclosure.

SUMMARY OF THE INVENTION

An object of the present invention is to provide a partition for a device box, which has a mounting post extending from its base member, comprising retaining members for positively securing the partition in place within the box, while permitting the removal of the partition from the box whenever necessary without difficulty.

Another object of the present invention is to provide a partition for a device box which is relatively inexpensive to manufacture.

Accordingly, another object of the present invention is to provide a partition for a device box having an improved and simplified construction, i.e., minimal parts that effect removable and frictional engagement between the partition and the device box.

The foregoing objects are basically attained by providing a partition for dividing a device box having a base member with a mounting post secured thereto into at least two sections to separate different incoming wiring systems, the partition comprising: a dividing member; and a retaining member coupled to the dividing member and configured to cooperate with the mounting post of the device box for supporting the dividing member against the base member of the device box. The retaining member is provided with a specific amount of interference in order to be frictionally retained on the post for detachably supporting the dividing member against the base member.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring to the drawings which form a part of this original disclosure.

DETAILED DESCRIPTION OF THE DRAWINGS

Figure 1:
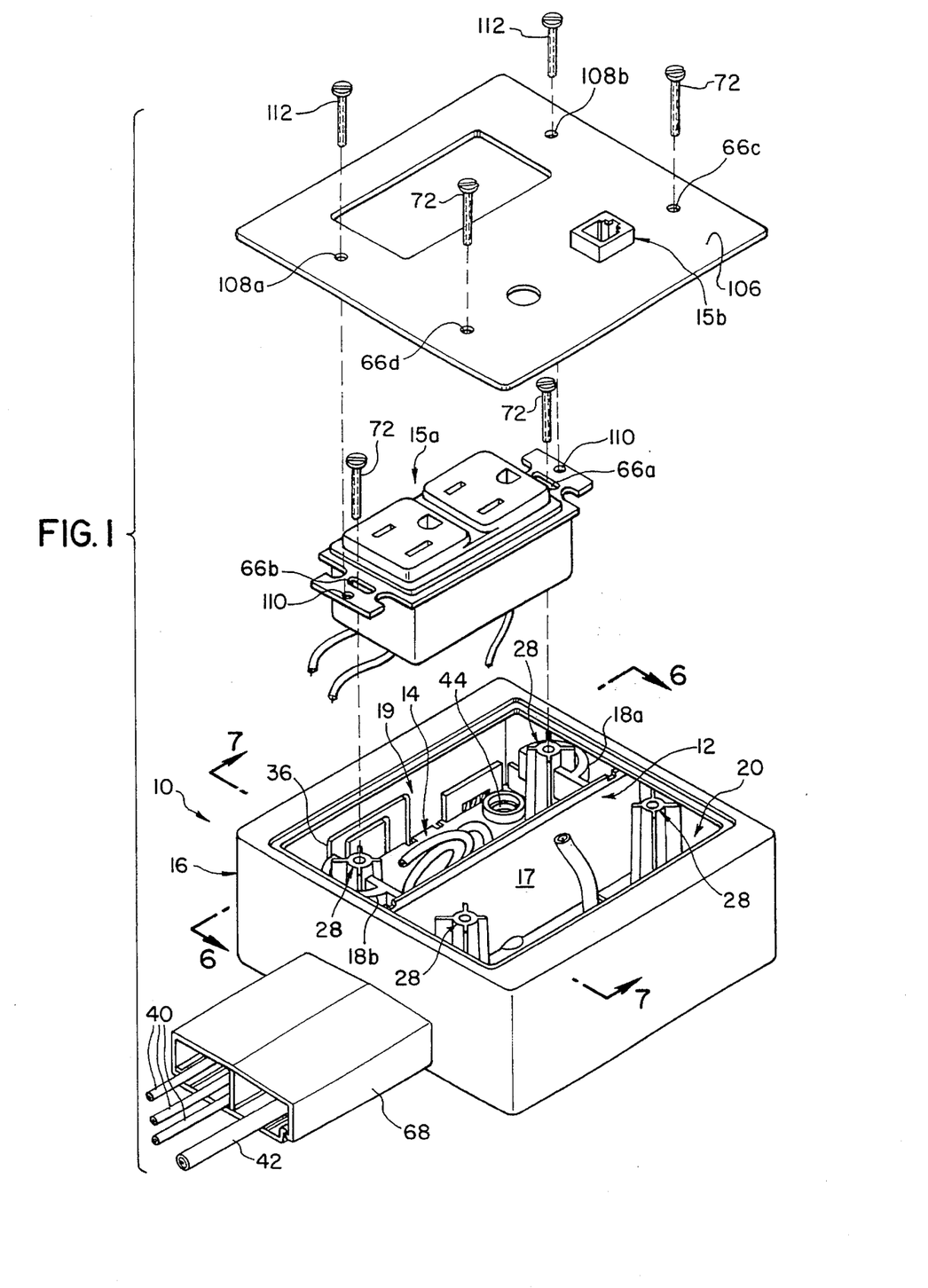
FIG. 1 is a perspective view of the combination of a device box and a partition constructed in accordance with the present invention with an electrical wiring device, telecommunications device and cover plate adapted to be coupled thereto.
Figure 2:
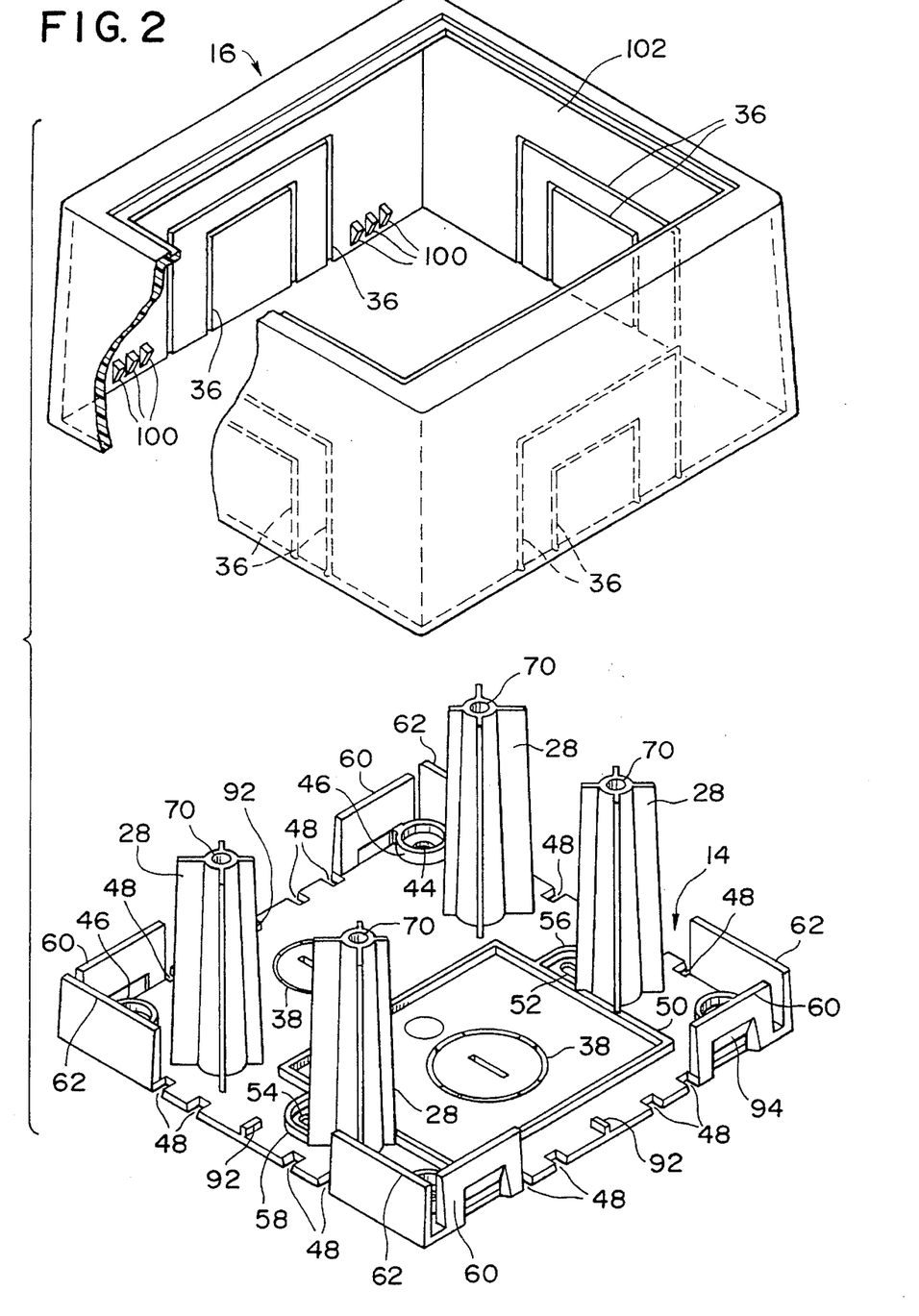
FIG. 2 is an exploded, perspective view of the device box illustrated in FIG. 1 with the partition removed for clarity.

Referring initially to FIGS. 1 and 2, a device box 10 in combination with a partition 12 is illustrated in accordance with the present invention. The device box 10 comprises a complementary base member 14 and a lid 16 which are detachably secured together in a manner discussed in further detail below. The base member 14 preferably has four substantially identical mounting posts 28 for mounting electrical/telecom devices such as electrical receptacle 15a and telecommunications device 15b thereto.

The partition 12 is provided with a dividing member 17 and a pair of retaining members 18a and 18b which cooperate with a pair of the mounting posts 28 to removably retain the partition 12 in an upright position with respect to the base member 14. The partition 12 is preferably dimensioned to divide the interior of the device box 10 into two sections 19 and 20.

Figure 3:
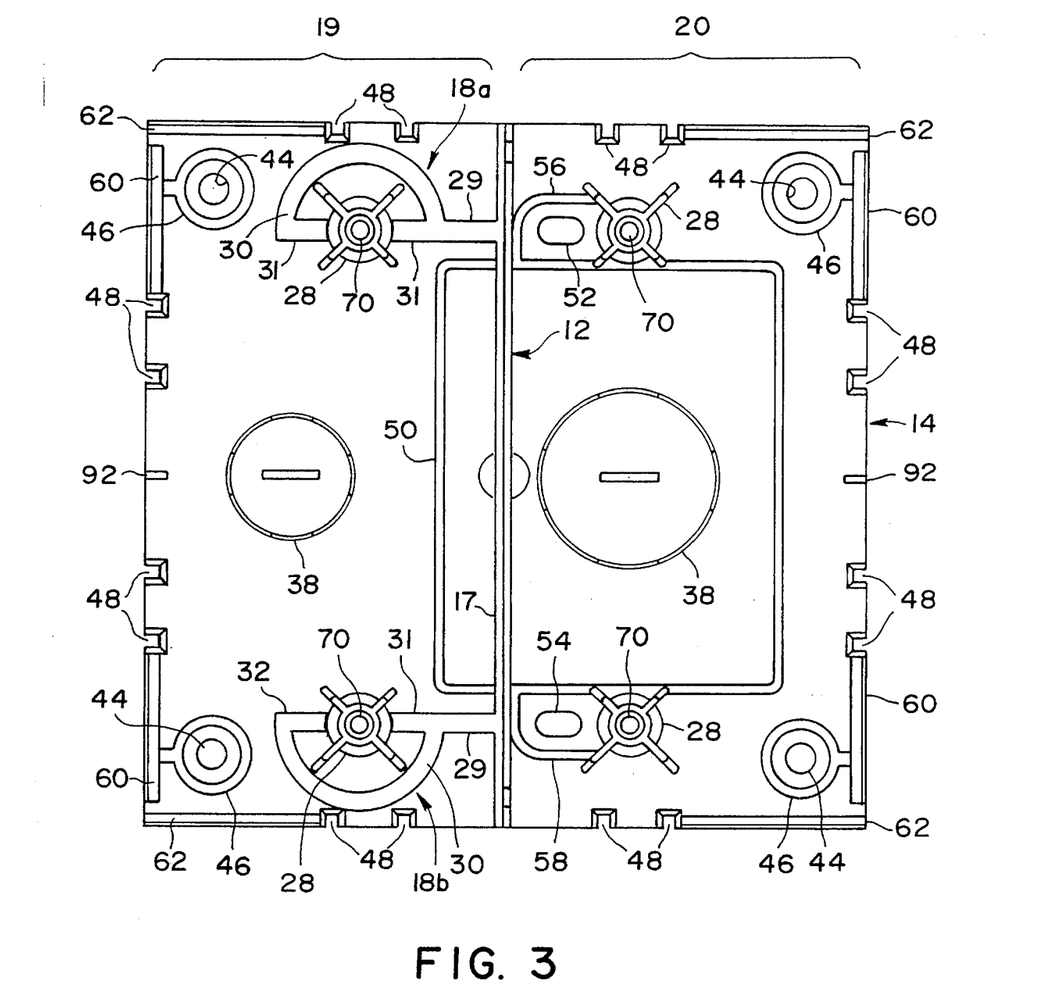
FIG. 3 is a top plan view of the combination of the device box and the partition depicted in FIG. 1 with the lid removed for clarity.
Figure 4:
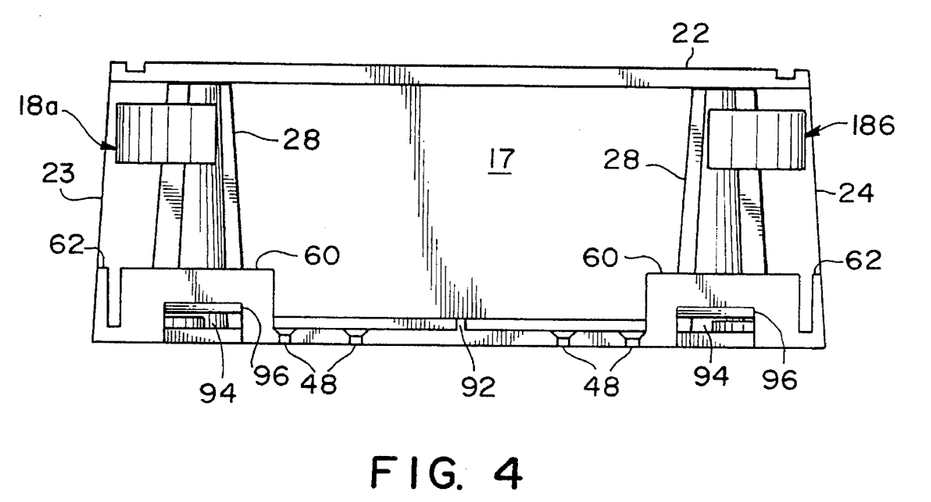
FIG. 4 is a side elevational view of the base member and partition illustrated in FIG. 3 with the lid removed.

As shown in FIG. 3, the partition 12 is preferably disposed across the entire width of the base member 14 and substantially centered thereon so that sections 19 and 20 are approximately the same size. The base member 14 is depicted as having four mounting posts 28. Two of the mounting posts 28 are disposed in each section 19 and 20, respectively.

As seen in FIG. 3, the two retaining members 18a and 18b extend from one side of dividing member 17. The retaining members 18a and 18b cooperate with two of the posts 28 disposed in one of the sections 19 and 20. The partition 12 can be rotated 180° to allow for similar cooperation between the retaining members 18a and 18b and the posts 28 in the other section. This versatility can be advantageous when accommodating different electrical/telecom devices in the sections 19 and 20.

Figure 8:
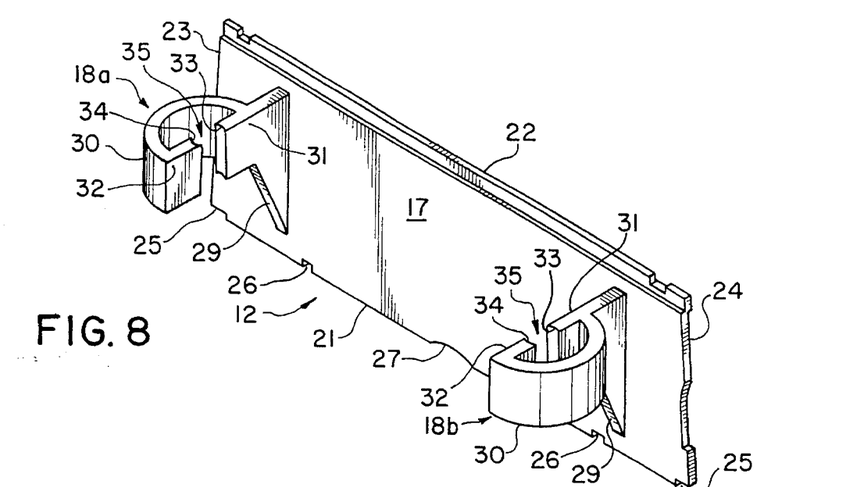
FIG. 8 is a perspective view of the partition illustrated in FIG. 1 and constructed in accordance with the present invention.
Figure 9:
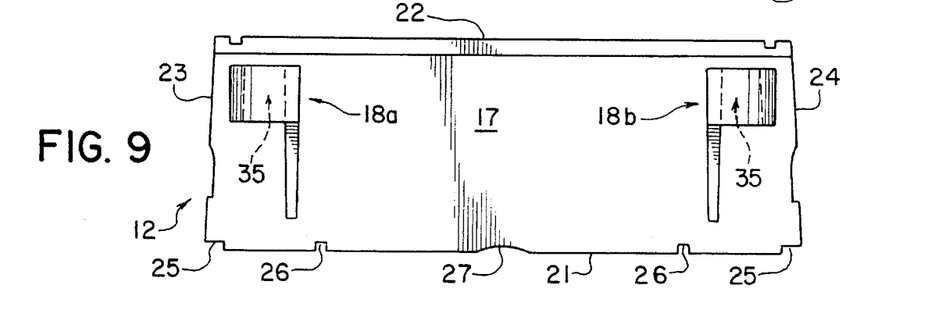
FIG. 9 is a side elevational view of the partition illustrated in FIG. 8.

As shown in FIGS. 2, 3 and 8, the dividing member 17 is preferably a thin substantially flat, planar member, which is dimensioned to extend essentially across the entire distance between two of the sides of the base member 14. Accordingly, the dividing member 17 extends substantially perpendicular from the base member 14. The dividing member 17 has a bottom edge 21 for engaging base member 14, a top edge 22 substantially parallel to the bottom edge 21 for engaging lid 16, and a pair of substantially parallel side edges 23 and 24. Preferably, side edges 23 and 24 converge slightly towards each other as they extend from bottom edge 21 to top edge 22 for accommodating the shape of lid 16. Accordingly, dividing member 17 is substantially rectangular in elevational view.

Figure 5:
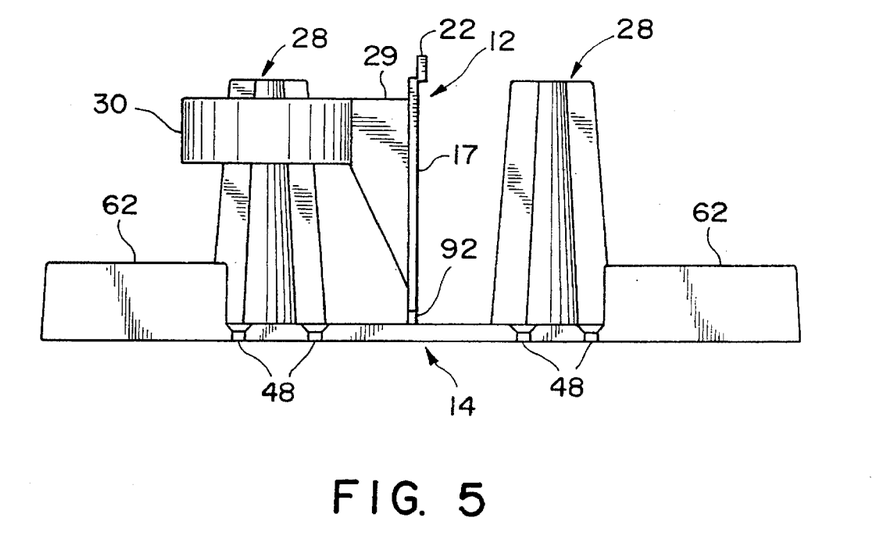
FIG. 5 is an end elevational view of the base member and partition illustrated in FIGS. 3 and 4 with the lid removed.
Figure 7:
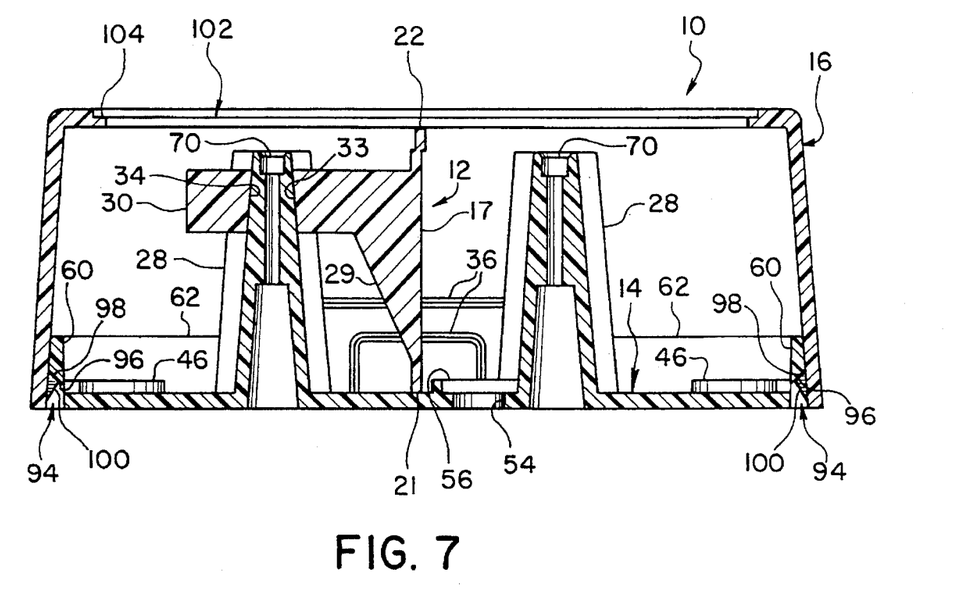
FIG. 7 is a transverse cross-sectional view of the combination of the electrical box and the partition illustrated in FIG. 1 taken along section line 7—7.

As shown in FIGS. 5, 7 and 8, the dividing member 17 of partition 12 is supported substantially perpendicularly with respect to the base member 14 so that the bottom edge 21 of the partition 12 contacts, or is in close proximity to the base member 14. The bottom edge 21 is formed to accommodate the contour of the base member 14. Accordingly, the bottom edge 21 of the partition 12 is provided with a plurality of indentations 25, 26 and 27 to provide clearance between the dividing member 17 and the contour of base member 14.

Figure 6:
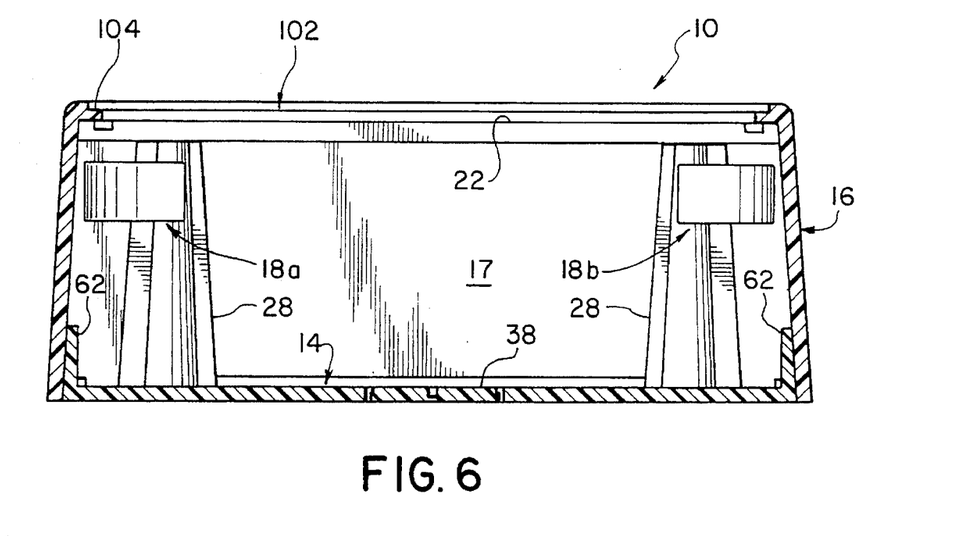
FIG. 6 is a transverse cross-sectional view of the combination of the electrical box and the partition illustrated in FIG. 1 taken along section line 6—6.

As shown in FIGS. 6 and 7, the top edge 22 of the dividing member 17 can be offset to provide additional space in one of the two sections 19 or 20 for accommodating electrical/telecom devices requiring additional space.

The retaining members 18a and 18b extend substantially perpendicularly from the dividing member 17, and each preferably includes a triangular bracket 29 with one end coupled to dividing member 17 and a C-shaped gripping member 30 coupled to the other end of bracket 29. The gripping members 30 cooperate with a pair of mounting posts 28 for coupling partition 12 to base member 14. Each of the triangular brackets 29 positions its respective gripping member 30 a predetermined distance away from the dividing member 17 so that dividing member 17 is held along the center of the device box 10. Of course, the brackets 29 can be dimensioned either larger or smaller to create two unequally sized sections, if needed or desired.

The gripping members 30 of partition 12 are shaped for cooperating with generally cylindrically-shaped or conically-shaped mounting posts 28. Accordingly, the gripping members 30 can vary in shape depending on the shape of the mounting posts 28 to ensure that each of the gripping members 30 frictionally engages its corresponding mounting post 28.

As shown in FIG. 3, the triangular brackets 29 are substantially planar and are spaced apart from each other by a distance corresponding to the distance between the longitudinal axes of two of the mounting posts 28. As seen in FIG. 7, the width of the triangular brackets 29 decreases as they extend from dividing member 17 of the partition 12 toward their gripping member 30. Each bracket 29 provides lateral support between the top and bottom edges of the partition 12. The brackets 29 also provide gripping members 30 greater flexibility to bend in conformance with the mounting posts 28 than would otherwise be available if the gripping members 30 were secured directly to the dividing member 17.

Figure 10:
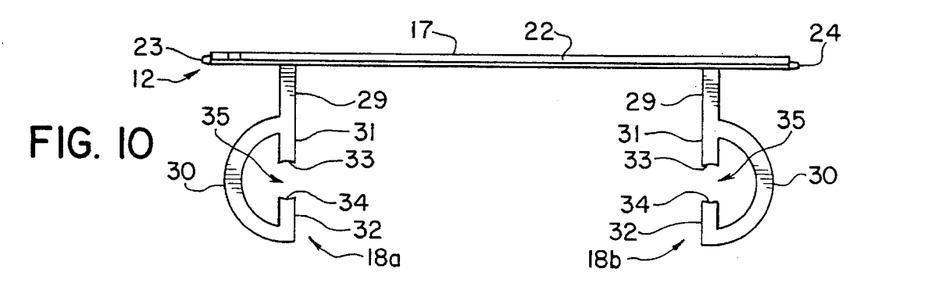
FIG. 10 is a top plan view of the partition illustrated in FIGS. 8 and 9 and constructed in accordance with the present invention.
Figure 11:
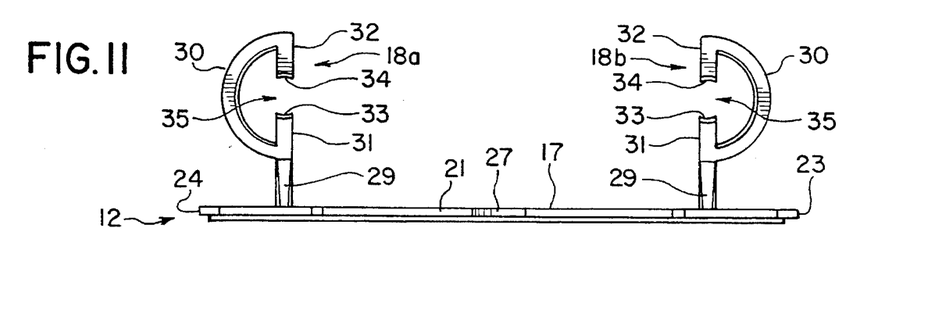
FIG. 11 is a bottom plan view of the partition illustrated in FIGS. 8–10.

As particularly seen in FIGS. 10 and 11, each gripping member 30 is preferably a semi-circular member. The respective ends of the gripping members 30 are formed with a pair of oppositely extending contacting members 31 and 32 having oppositely facing gripping surfaces 33 and 34. As shown in FIGS. 1 and 3, the gripping surfaces 33 and 34 of each of the retaining members 18a and 18b frictionally engage opposite surfaces on a corresponding mounting post 28.

With reference to FIGS. 8–11, the surfaces 33 and 34 of the contacting members 31 and 32, which abut the mounting post 28, are curved about the longitudinal axis of the respective mounting post 28 and slope away from each other to form a diverging slot 35. This configuration of the contacting members 31 and 32 enhances the frictional engagement of the gripping members 30 with the mounting posts 28 when tapered mounting posts 28 are used, i.e., when the cross section of the mounting post increases gradually from its free end toward the end secured to the base member 14.

The C-shaped gripping members 30 are sufficiently resilient for allowing the slot 35 to increasingly diverge, or spread apart. Therefore, the inner radius of the gripping members 30 gradually increase as the gripping members 30 are guided along the mounting post 28 toward the base member 14. In other words, the contacting members 31 and 32 of each of the griping members 30 are spread apart from each other to frictionally engage their respective mounting post 28. The frictional forces between the contacting members 31 and 32 and corresponding mounting posts 28 increase as the gripping members 30 are mounted thereto. Accordingly, the entire partition 12 is frictionally coupled to the base member 14. Thus, the retaining members 18a and 18b are designed with a specific amount of interference to cause a spring action in its material for gripping its corresponding mounting post 28.

In addition to the frictional forces associated with the gripping members 30, the partition 12 is removably retained within the interior of the device box 10 by lid 16 which abuts the top edge 22 of the partition 12 as shown in FIGS. 6 and 7. Accordingly, the gripping members 30 can be formed without the friction fit or spring action, if needed or desired.

With continued reference to FIGS. 6, 7 and 8, the C-shaped gripping members 30 and their corresponding triangular brackets 29 are preferably formed with the dividing member 17 from a hard yet somewhat resilient material such as plastic. Preferably, a conventional molding process is used to create an integral, one-piece, unitary partition 12.

The lid 16 and the base member 14 are provided with knock-out elements 36 and 38, respectively, which can be punched out to create openings for receiving wiring from the exterior of the device box into its interior. As shown in FIG. 1, separate wiring systems such as power conductors 40 and communication conductor 42 can be guided into the sections 19 and 20 of the device box 10, respectively. The base member 14 of the device box 10 includes one or more mounting apertures 44 which are each configured to receive a screw for mounting the device box 10 to a wall surface or any other suitable mounting surface.

The components of the device box 10 now shall be described in further detail in connection with FIGS. 2, 3, 4 and 5. The base member 14 is preferably a substantially planar, rectangular member formed from a substantially rigid material. Since the device box 10 is used in electrical applications, the base member 14 and the lid 16 are both preferably formed from a nonconductive, hard, synthetic material such as plastic. Of course, other materials such as metal can be used, if needed or desired.

As seen in FIG. 3, the base member 14 includes a pair of knock-out elements 38, a plurality of mounting apertures 44 with a circular reinforcing ridge 46 encircling each of the apertures 44, four notches 48 formed in each of the four edges of base member 14, a pair of oblong apertures 52 and 54 for mounting the base member 14 to another device box (not shown), a pair of curved reinforcing ridges 56 and 58 extending partially around apertures 52 and 54, respectively, two coupling flanges 60 extending upwardly from two sides of the base member 14, and two positioning flanges 62 extending upwardly from each of the other two sides of base member 14. As mentioned above, the base member 14 is also provided with four mounting posts 28 extending perpendicularly therefrom. Each mounting post 28 is preferably formed on the base member 14 from plastic using a molding process to create a unitary, one-piece, integral member.

As shown in FIGS. 1, 6 and 7, each mounting post 28 is configured with an axially extending bore 70 for receiving one of the screws 72 therein. Thus, screws 72 can be inserted through the apertures 66a and 66b of electrical device 15a and apertures 66c and 66d of cover plate 106 with telecommunications device 15b coupled thereto via a snap-fit and then threaded into the bores 70 of the posts 28 to secure the electrical device 15a and telecommunications device 15b within the box 10.

Alternatively, the base member 14 can be configured with only a single mounting post or with three or more mounting posts in each section. The spaced-apart pair of mounting posts in each section of the device box, however, best accommodates the installation of most electrical/telecom devices such as switches, connectors, etc.

As shown in FIGS. 2 and 3, the base member 14 is formed with one of the mounting apertures 44 located in each corner of base member 14. These apertures 44 are configured to receive screws (not shown) for mounting the base member 14 to another surface such as a wall in a residential or commercial building. Each aperture 44 is surrounded by a circular, stiffening or reinforcing ridge 46 which reinforces the area of the base member 14 around the aperture 44 to reduce cracking and other stress fractures resulting from applying torque to a screw threaded through the aperture. The ridges 46 are also designed to meet specifications of Underwriters Laboratories (UL) for preventing contact between wires and the heads of screws inserted in the apertures.

Referring to FIGS. 1 and 2, the device box 10 can optionally be provided with additional apertures by punching the circular knock-out elements 38 of base member 14 or the rectangular knockout elements 36 of lid 16. Thus, wiring can be guided either through an opening in the surface on which the device box is mounted and into the interior of the device box via an aperture in the base member 14, or through an opening in the lid 16 via a raceway or conduit 68.

Preferably, the lid 16 is provided with one knock-out element 36 on each of its four sides. Thus, wiring which is guided through raceway or conduit 68 along the surface on which the box 10 is mounted, and then can enter the interior of the box 10 via the lid 16, as opposed to through the base member 14. Preferably, each of the knockout elements 36 is formed with a pair of U-shaped recesses, as illustrated in connection with knockout element 36 in FIG. 2, to accommodate different sizes of conduits or raceways. Thus, knockout elements 36 can accommodate two different sizes of raceway or conduit 68 by breaking-away the knockout elements 36 either along one or the other of the two U-shaped recesses.

As shown in FIGS. 1 and 2, the four notches 48 in the sides of base member 14 facilitate alignment of an aperture, which is created in the side of the lid 16 by removing a knockout element 36, with a conduit or raceway 68 that feeds wires through the aperture.

As shown in FIG. 2, the base member 14 comprises two arcuate ridges 56 and 58 extending between the rectangular ridge 50 and an adjacent mounting post 28 for surrounding oblong apertures 52 and 54. The oblong apertures 52 and 54 allow the base member 14 to be secured to a wall or another device box. The arcuate ridges 56 and 58 prevent cracking and meet the UL specifications discussed above in connection with the ridge 46.

The cooperation of the lid 16 with the base member 14 is described with continued reference to FIGS. 6 and 7. Two of the four sides of the base member 14 are provided with two rectangular coupling flanges 60, while the other two sides of the base member 14 are provided with a pair of positioning flanges 62.

The edge of each side of base member 14 is provided with four notches 48 as well as an essentially centrally located rectangular protrusion 92. The rectangular protrusion 92 serves as a visible indication of the midpoints along the base member 14 sides to aide a human operator when installing the box 10.

As seen in FIG. 7, the coupling flanges 60 include a rectangular recess 94. Preferably, the recess 94 extends completely through the flange 60 to create a rectangular aperture. The top surface of the recess 94 is formed diagonally with respect to the vertical axis of the flange 60 to create an angled lip 96. As shown in FIG. 7, the angled lip 96 cooperates with a correspondingly angled surface 98 associated with a triangular protrusion 100, which extends from the interior wall of the lid 16, to permit a snap-fit assembly of the lid 16 and the base member 14.

With reference to FIG. 2, the lid 16 corresponds in shape to the base member 14. The interior perimeter of the lid 16 is slightly larger than the outer perimeter of the base member 14. When the lid 16 slidably engages the four coupling flanges 60 and four positioning flanges 62 of base member 14, the lid 16 is removably mounted on the base member 14 by the snap-fit cooperation between the angled lip 96 on four of the coupling flanges 60 with the upper surface of several triangular protrusions 100 provided on the interior surface of the lid 16. For example, a set of three triangular protrusions 100 for each flange having a recess can be formed on the lid 16 from plastic as a unitary, one-piece member using a molding process. Each set of protrusions 100 can be disposed on the interior of the lid 16 so as to be opposite the aperture 94 of its corresponding flange 60 when the lid 16 and base member 14 are assembled together. The lid 16 can be relatively easily removed from the base member 14, even when the base member 14 is secured to a surface, by overcoming the frictional forces between the flanges and the lid 16, and provided by the snap-fit cooperation of the triangular protrusions 100 with the angled lip 96 in the rectangular apertures 94.

As shown in FIGS. 1, 2, and 6, the lid 16 is formed with a large geometrically shaped opening 102 to expose the base member 14 and any devices secured to the mounting posts 28. The opening 102 is characterized by a recess forming a lip 104 around the opening. A rectangular cover plate 106 can be placed over the opening, the perimeter of which is defined by the lip 104, and secured against the lip 104 to enclose the interior of the box. The cover plate 106 can be flush with the lid 16 for improved aesthetics. Mounting apertures 66c, 66d, 108a and 108b are provided in the cover plate 106 and aligned with a pair of posts 28 and a pair of apertures 110 in a device which is mounted within the box 10. A screw 112 can be driven through each of the aligned apertures 108 in the cover plate 106 and then threaded into apertures 110 of the device 15a, while a pair of screws 72 are threaded into two of the posts 28 for rigidly securing the cover 106 plate in its place.

The partition 12 of the present invention overcomes many of the limitations and disadvantages associated with the partitions of the prior art. The partition 12 is frictionally and removably engaged within the interior of a device box 10 having a mounting post 28 without the aid of screws or other separate fasteners. The partition 12 is readily removable from the interior of the device box 10 by removing the lid 16 and sliding the retaining members 18a and 18b off their respective mounting posts 28. The retaining members 18a and 18b can also provide lateral support to partition 12. Further, the partition 12 is relatively inexpensive and easy to manufacture because it can consist of a unitary piece formed from a preferably resilient material such as plastic.

While only one embodiment has been chosen to illustrate the present invention, it will be apparent to those skilled in the art that various changes and modifications can be made herein without departing from the scope of the invention as defined in the appended claims.

What is claimed is:

1. A partition dimensioned to be releasably coupled to a pair of mounting posts of a device box for dividing the device box into at least two sections to separate different incoming wiring systems, said partition comprising:

a dividing member having a top edge, a bottom edge and a pair of side edges extending between said top and bottom edges;

a pair of brackets coupled to and extending outwardly from said dividing member; and a pair of gripping members coupled to said dividing member via said brackets and configured to be releasably coupled to the pair of mounting posts of the device box for supporting said dividing member within the device box to divide the device box into said at least two sections.

2. A partition according to claim 1, wherein each of said gripping members has a slot for at least partially frictionally engaging one of mounting posts to detachably support said dividing member within the device box.

3. A partition according to claim 2, wherein said dividing member is formed of a thin, substantially flat material.

4. A partition according to claim 2, wherein said dividing member is formed from a substantially nonconductive material.

5. A partition according to claim 4, wherein said dividing member, said brackets and gripping members are formed as a one-piece, unitary, integral member.

6. A partition according to claim 1, wherein each of said gripping members has a slot for slidably receiving one of the mounting posts therein to removably support said dividing member in the device box.

7. A partition according to claim 7 6, wherein each of said gripping members is configured to at least partially circumscribe one of the mounting posts to engage at least two surfaces thereof.

8. A partition according to claim 13 1, wherein said dividing member is dimensioned such that said bottom edge is adapted to abut against a base member of the box and said top edge is adapted to engage a lid coupled to the base member when said divider member is installed within the device box.

9. A partition for dividing a device box having a base member with a mounting post secured thereto into at least two sections to separate different incoming wiring systems, said partition comprising:

a dividing member; and retaining means, coupled to said dividing member and configured to cooperate with the mounting post of the device box, for supporting said dividing member against the base member of the device box, said retaining means being slidably receivable around the mounting post to removably support said dividing member substantially perpendicularly to the base member of the device box, said retaining means comprising a gripping member fixedly secured to said dividing member and extending outwardly from said dividing member, said gripping member comprising a pair of oppositely facing contacting members for frictionally engaging two surfaces on the mounting post, respectively, said gripping member being configured to at least partially circumscribe the mounting post to engage at least said two surfaces of the mounting post.

10. A partition according to claim 9, wherein
said contacting members comprise a pair of oppositely facing contact surfaces sloping away from each other to form a diverging slot for accommodating the mounting post of the device box when the mounting post has a tapered surface such that the cross-section of the post decreases gradually away from the base member.

11. A partition for dividing a device box having a base member with mounting post secured thereto into at least two sections to separate different incoming wiring systems, said partition comprising:

a dividing member; and retaining means, coupled to said dividing member and configured to cooperate with the mounting post of the device box, for supporting said dividing member against the base member of the device box, said retaining means being slidably receivable around the mounting post to removably support said dividing member substantially perpendicularly to the base member of the device box, said retaining means comprising a gripping member fixedly secured to said dividing member and extending outwardly from said dividing member, said gripping member being configured to at least partially circumscribe the mounting post to engage at least two surfaces of the mounting post said gripping member being formed from resilient material with contacting surfaces forming a slot that increases in width for slidably receiving the mounting post when the mounting post has a tapered surface such that the cross-section of the mounting post decreases gradually away from the base member.

12. A partition for dividing a device box having a base member with a mounting post secured thereto into at least two sections to separate different incoming wiring systems, said partition comprising:

a dividing member having a top edge portion which is offset from a bottom portion for providing additional space on one side of said dividing member along said top edge portion than the other side of said dividing member; and retaining means, coupled to said dividing member and configured to cooperate with the mounting post of the device box, for supporting said dividing member against the base member of the device box.

13. A device box assembly for housing electrical and telecommunications devices, comprising:

a first substantially planar base member having at least two mounting posts extending substantially perpendicularly therefrom;

a partition with a pair of retaining members for engaging said mounting posts to detachably support said partition to said base member; and a lid detachably coupled to said base member for defining with said base member an interior of said device box assembly, said partition being supported by said mounting posts to divide said interior into at least two sections.

14. A device box assembly according to claim 13, wherein said partition is coupled to said base member to divide said interior into two substantially equal sections.

15. A device box assembly according to claim 14, wherein an upper portion of said partition is offset from a lower portion of said partition to accommodate a larger device in one of said sections than the other of said sections.

16. A device box assembly according to claim 15, wherein said lid abuts against said partition to apply a retaining force for maintaining said partition stationary relative to said base member when said lid is attached to said base member.

17. A device box assembly according to claim 16, wherein said partition is constructed from a resilient material.

18. A device box assembly according to claim 13, wherein each retaining member is configured to at least partially circumscribe one of the mounting posts to engage at least two surfaces thereof with the mounting post.

19. A device box assembly according to claim 18, wherein said partition includes a thin, substantially flat dividing member.

20. A device box assembly according to claim 19, wherein each of said retaining member at least partially frictionally engages one of the mounting posts to detachably support said dividing member adjacent the base member of the device box.

21. A device box assembly for housing electrical and telecommunications devices, comprising:

a base member having at least two mounting posts extending substantially perpendicularly therefrom;

a partition with a pair of retaining members for engaging said mounting posts to detachably support said partition to said base member; and a lid detachably coupled to said base member for defining with said base member an interior of said device box assembly, said partition being supported by said mounting posts to divide said interior into at least two sections.

22. A device box assembly according to claim 21, wherein said lid has a top wall with four downwardly extending sides.

23. A device box assembly according to claim 22, wherein said base member has four of said mounting posts extending substantially perpendicularly therefrom.

24. A device box assembly according to claim 21, wherein said lid abuts against said partition to apply a retaining force for maintaining said partition stationary relative to said base member when said lid is attached to said base member.

25. A device box assembly according to claim 21, wherein said partition includes a thin, substantially flat dividing member with said retaining members extending from one side of said dividing member.

* * * * *